United States Patent [19]
Tamura et al.

[11] Patent Number: 5,408,549
[45] Date of Patent: Apr. 18, 1995

[54] OPTICAL FIBER WIRING SWITCHING APPARATUS

[75] Inventors: Mitsuaki Tamura; Kazuhito Saito; Toru Yamanishi, all of Kanagawa; Hideo Kobayashi, Ibaraki, all of Japan

[73] Assignees: Sumitomo Electric Industries, Ltd., Osaka; Nippon Telegraph & Telephone Corporation, Tokyo, both of Japan

[21] Appl. No.: 193,853

[22] Filed: Feb. 9, 1994

[30] Foreign Application Priority Data

Feb. 10, 1993 [JP] Japan .................................. 5-22308
Dec. 27, 1993 [JP] Japan ................................. 5-330653

[51] Int. Cl.6 .......................... G02B 6/26; G02B 6/28
[52] U.S. Cl. ...................................... 385/16; 385/17; 385/24; 385/25; 385/31; 385/48
[58] Field of Search ...................... 385/15, 16, 17, 24, 385/25, 22, 31, 32, 134, 135, 136, 137, 48, 65, 66, 68, 83, 84, 85, 43, 128

[56] References Cited

U.S. PATENT DOCUMENTS

| | | | |
|---|---|---|---|
| 4,741,584 | 5/1988 | Segerson ........................... | 385/48 X |
| 4,747,652 | 5/1988 | Campbell et al. ................ | 385/48 X |
| 4,759,605 | 7/1988 | Shen et al. ........................ | 385/48 X |
| 4,810,052 | 3/1989 | Fling ................................. | 385/48 X |
| 4,822,125 | 4/1989 | Beals et al. ....................... | 385/48 X |
| 4,886,335 | 12/1989 | Yanagawa et al. .............. | 385/16 X |
| 4,887,879 | 12/1989 | Prucnal et al. ................... | 385/48 X |
| 4,946,247 | 8/1990 | Muska et al. ..................... | 385/16 X |
| 5,029,962 | 7/1991 | Uken et al. ....................... | 385/48 |
| 5,031,994 | 7/1991 | Emmons ........................... | 385/16 X |
| 5,069,519 | 12/1991 | James et al. ...................... | 385/32 |
| 5,235,657 | 8/1993 | Tardy ............................... | 385/25 X |
| 5,337,378 | 8/1994 | Saito et al. ....................... | 385/16 |
| 5,343,541 | 8/1994 | Uken et al. ....................... | 385/16 |

FOREIGN PATENT DOCUMENTS

| | | | |
|---|---|---|---|
| 196148 | 10/1986 | European Pat. Off. ........... | 385/16 X |
| 323920 | 7/1989 | European Pat. Off. ........... | 385/16 X |
| 567143 | 10/1993 | European Pat. Off. ........... | 385/16 X |
| 3287212 | 12/1991 | Japan ............................... | 385/16 X |

OTHER PUBLICATIONS

Patent Abstract of Japan, vol. 13 No. 82 (P-833)(3430) Feb. 1989 re JP-A 63-264718.
T. Katagiri et al, "Cassette Type Non Blocking 100×100 Optomechanical Matrix Switch", IEICE Transactions on Communications, vol. E75-B No. 12, Dec. 1992 pp. 1373-1375.

*Primary Examiner*—Brian Healy
*Attorney, Agent, or Firm*—Cushman Darby & Cushman

[57] ABSTRACT

An optical fiber switching apparatus having a guide frame which is supported by an apparatus body. The guide frame has a guide groove. Disposed on the guide grooves is a movable moving member. The moving member can be moved by the apparatus along the guide groove. A slide terminal is connected by a support to the moving member. The support allows the slide terminal to approach the moving member and thereby causing the slide terminal to enter an unlocked position or to move away from the moving member and thereby causing the slide terminal to enter a locked position. The slide terminal support an end face of an optical fiber. The apparatus also includes a driving wire which has two end portions. The end portions are disposed through the moving member and are coupled to the slide terminal, thereby forming a loop in the driving wire. The apparatus can move the slide terminal by causing tension in the driving wire so as to cause the slide terminal to enter the unlocked position, and thereby allowing the moving member to-move along the guide groove by a longitudinal movement of the driving wire.

9 Claims, 8 Drawing Sheets

OPTICAL FIBER WIRING SWITCHING APPARATUS

BACKGROUND OF THE INVENTION

1. Field of the Invention

The present invention relates to an optical fiber switching apparatus that can be used in a coupling portion which performs operations such as switching for systems in which optical fibers are coupled so as to constitute a fiber optic network or the like.

2. Description of the Prior Art

Although an optical fibers have been used in trunk line communication systems, research aimed at introducing fiber optic network systems is currently being conducted. Unlike systems which repeat transfers from point to point, it is necessary for a fiber optic network system to provide superior serviceability and efficiency for the distributed users which are on the same level. In order to design such a fiber optic network system, it is important to provide a switching apparatus such as, for example, an optical cross-connection apparatus, an optical switch board, etc. for switching the optical fibers without adversely affecting the light signals transmitted therein.

Apparatuses such as the optical cross-connection apparatus are often referred to as "huge optical switches". Although various research is being conducted, it has proven difficult to develop a relatively small optical switch which has multiple inputs and multiple outputs. The difficulty arises because the number of coupled lines becomes large when optical fibers are coupled in a network. The optical fibers become so crowded that the working efficiency of the coupled optical fiber decreases drastically. It is also possible for the optical fibers to be misconnected. Moreover, the overcrowding of the optical fibers becomes even more severe when a coupling point is intended to be switched to another terminal.

A conventional optical switch which has been used for the aforementioned switching is a "1×N" (i.e. single×plural) type optical switch. In a 1×N type optical switch, a single-core connector is disposed on the "1-side" (i.e. single-side) while a plurality of single-core connectors are disposed on the "N-side" (i.e. plural-side) on the same level. Thus, the single-core connector on the 1-side is carried by a switching mechanism, thereby allowing the 1-side single-core connector to be coupled with a desired connector on the N-side.

Another conventional optical switch is a "N×M" (i.e. plural×plural) type optical switch. In an N×M type optical switch, a plurality of guide rails disposed in the direction perpendicular to each other are provided. The optical fibers are attached to slide terminals which can move along a corresponding one of the guide rails. Thus, the slide terminals are moved by a switching mechanism so as to make a connection between desired optical fibers. Such an optical fiber connection switching apparatus is disclosed in Unexamined Japanese Patent Publication No. Hei-3-287212.

Optical fibers are connected with each other by placing an end surface of one optical fiber so that it is opposite to an end surface of another optical fiber. A driving mechanism is then used to move, position and hold the optical fiber. A conventional optical fiber driving mechanism is one that holds an optical fiber by use of a pair of driving rollers, and rotates the driving rollers so as to move the optical fiber which is being held. This type of driving mechanism has been used as a means for placing optical fibers so that they are opposite to each other.

Each of the aforementioned optical switches can adequately be applied in a limited number of special conditions. However, various problems occur when a large number of optical fibers are used in optical fiber network. For example, if switching is required when there are a large number of optical fibers, it is necessary to miniaturize and integrate the optical while maintaining the ease of operation thereof. However, as mentioned above, it is difficult to make relatively small optical switches.

If a switch having the function of an N×M type optical switch is intended to be realized through the use of conventional 1×N type optical switches, at least (M) 1×N type optical switches would be required. For example, if a switch having a function of 8×12 were required, (12) 1×8 type optical switches would have to be used. Thus, It is difficult to miniaturize the apparatus due to the space which is occupied by each of the 1×N type optical switches. On the other hand, in a true N×M type optical switch, it is possible to miniaturize the apparatus in comparison with a switch having the same function but being comprised of 1×N type optical switches. However, a switching mechanism would be required in the true N×M type optical switch for moving respective slide terminals on the N-side and the M-sides along their corresponding guide rails.

If it is necessary to switch a plurality of slide terminals at the same time, a plurality of such switching mechanisms would be needed. The number of switching mechanisms required would be equal to the total number of optical fibers (i.e. N+M). Thus, miniaturize the N×M type optical switch is difficult. Moreover, highly rigid guide rails are needed for positioning the slide terminals with a high degree of accuracy. Therefore, it is impossible to miniaturize the slide terminals or the guide rails. Accordingly, a large switching mechanism causes design problems.

On the other hand, in a conventional optical fiber driving mechanism, the pair of driving rollers which are holding an optical fiber are merely rotated so as to move the optical fiber. Therefore, the structure of the driving mechanism can readily be achieved. However, there are many problems with the miniaturization of this type of optical switch which are similar to the problems encountered with the miniaturization of the aforementioned switching mechanism used in N×M type optical switches. For example, when driving mechanisms are used in an N×M type optical switches, a driving mechanism must be provided for each optical fiber on the N-side and the M-side, thereby making it difficult to miniaturize the optical switch. Moreover, when a driving mechanism is used, it becomes necessary to position a slide terminal with a high degree of accuracy. Therefore, it is necessary to provide a device, which is separate from the driving mechanism, so as to ensure a high degree of accuracy in the positioning of the slide terminal. This added device cause the cost of the optical switch to increase.

SUMMARY OF THE INVENTION

The present invention solves the foregoing problems. It is an object of the present invention to provide a relatively small optical fiber switching apparatus which has a relatively simple structure at a reduced cost and maintains the ease of switching operations.

In order to attain the foregoing object, the optical fiber switching apparatus, according to the present invention, is characterized in that the apparatus has an apparatus body. A guide frame, which is supported by the apparatus body, has a guide groove. A moveable moving member is disposed on the guide groove. A slide terminal for supporting an end face of an optical fiber is also provided. The apparatus includes support means for connecting the slide terminal to the moving member. This connection enables the slide terminal to approach or move away from the moving member and also causes the slide terminal to enter a predetermined locked position on the guide frame. The apparatus includes a driving wire which has two end portions. The end portions are disposed through the moving member and are coupled to the slide terminal. By this arrangement of the driving wire, a loop is formed. The apparatus can then move the slide terminal by causing tension on the driving wire which in turn cause the end portions to move the slide terminal towards the moving member. When the slide terminal is moved towards the moving member, the moving member and the slide terminal are free to move along the guide groove by the longitudinal movement of the driving wire.

According to another embodiment of the present invention, an optical fiber switching apparatus has a first and a second side. The apparatus also includes optical coupling members disposed on the first side of the apparatus so as to be substantially parallel to each other. A guide frame, which is supported on the second side of the apparatus and has a guide groove, is also provided. The guide grove extends in a direction so as to be substantially perpendicular to a direction of each of the optical coupling members. A moveable moving member is disposed on the guide groove. The apparatus also includes a slide terminal for supporting an end face of an optical fiber and support means for connecting the slide terminal to the moving member. The support means enables the slide terminal to approach the moving member and causes the slide terminal to enter a predetermined locked position on the guide frame where the end face of the optical fiber is disposed opposite to a selected one of the optical coupling members. The apparatus also includes a driving wire which has two end portions. The end portions of the driving wire are disposed through the moving member and are coupled to the slide terminal. By this arrangement a loop is formed in the driving wire. The apparatus also includes means for moving the slide terminal by creating tension on the driving wire. When tension is created, the end portions of the driving wire move the slide terminal towards the moving member. When the slide terminal is moved towards the moving member, the moving member and the slide terminal are free to move along the guide groove by the longitudinal movement of the driving wire.

In another embodiment of the present invention, an optical fiber switching apparatus has first and second guide frames. The first guide frames are stacked so that they are all substantially parallel to each other. The second guide frames are stacked so that they are all substantially parallel to each other and substantially perpendicular to each of the first guide frames. Each guide frame has a guide groove and an engagement groove. Moving members are also provided. Each moving member is disposed on a corresponding one of the guide grooves. The apparatus also includes slide terminals, each for supporting an end face of an optical fiber. Means are also provided for connecting each of the slide terminals to a corresponding one of the moving members, for enabling each slide terminal to approach or move away from the corresponding moving member, and for causing each slide terminal to enter a corresponding predetermined locked position along a corresponding one of the engagement grooves. The apparatus also includes first driving wires, each having two end portion. The end portions of each driving wire are disposed through a corresponding one of the moving members and are coupled to a corresponding one of the slide terminals, thereby forming a loop in each of the driving wires. Finally, means are provided for moving each slide terminal by tension of a corresponding one of the driving wires so as to cause the end portions of the corresponding driving wire to move the corresponding one of the slide terminal towards or away from the corresponding one of the first moving member, and for moving each moving member along the corresponding guide groove by the longitudinal movement of the corresponding one of the driving wires, thereby causing a corresponding one of the slide terminals to move toward the corresponding predetermined locked position along the corresponding engagement groove.

Finally in another embodiment of the present invention, the optical fiber switching apparatus has first and second guide frames. The first guide frames are stacked so that they are all substantially parallel to each other. The second guide frames are stacked so that they are all substantially parallel to each other and substantially perpendicular to each of the first guide frames. Each guide frame has a guide groove and an engagement groove. A moveable moving member is disposed on each of the guide grooves. The apparatus has means for moving each moving member. Elastic members and slide terminals are also provided. Each slide terminal is connected by one of the elastic members to a corresponding one of the moving members, thereby allowing each slide terminal to either approach the corresponding moving member and thereby cause the slide terminal to enter an unlocked position along the engagement groove or to move away from the corresponding moving member and thereby cause each slide terminal to enter a locked position along the engagement groove. Each slide terminal has either a support means for supporting a first optical fiber which has a first end face or a capirally which has a second end face of a second optical fiber fixed therein. By the foregoing apparatus, a selected one of the first optical fiber can be inserted into a selected one of the capirallies when the slide terminal which corresponds to the selected first optical fiber enters the locked position and the slide terminal which corresponds to the selected capirally enters the locked position. Therefore, optical coupling between the selected first optical fiber and the second optical fiber which corresponds to the selected capirally can occur.

The apparatus described above may include capirallies which have taper-shaped insertion opening. Each taper-shaped insertion opening has an internal diameter which decreases and an inside face which is smooth. The first end face may be rounded. Rounding of the end face may be done by grinding or electrical discharging. The first optical fiber may be coated by a carbon layer. A silicone thin film may be formed on each of the second end faces.

DESCRIPTION OF THE PREFERRED EMBODIMENTS

Specific embodiments of the present invention will now be described in detail with reference to the Figures.

Figure 5:
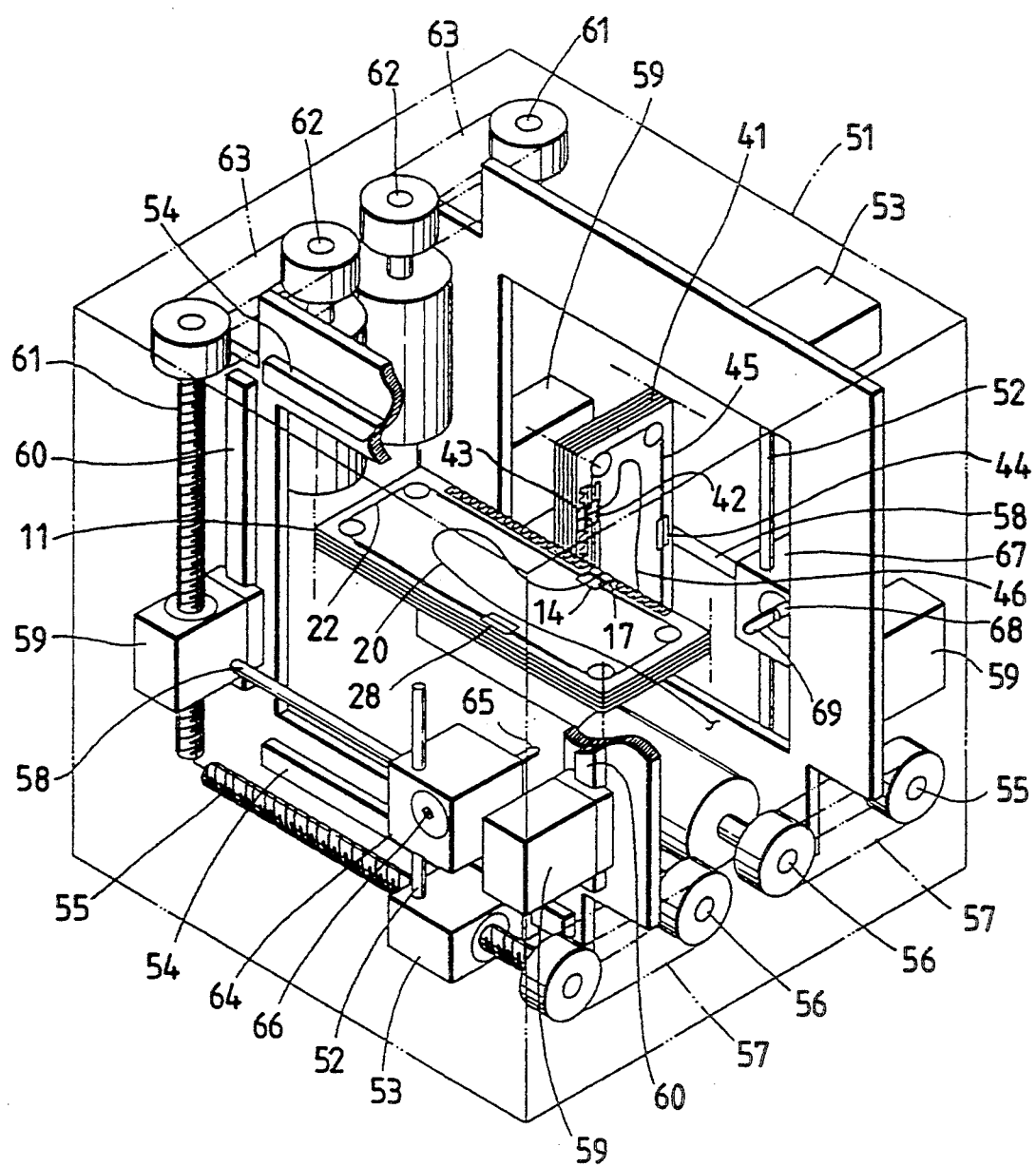
FIG. 5 is a schematic perspective view of an optical fiber switching apparatus as formed into a unit.

An optical fiber switching apparatus, according to the present invention, can make a connection (i.e. optical coupling) between a plurality of optical fibers. The optical fiber switching apparatus can also switch the connection between the optically coupled optical fibers. FIG. 5 depicts a plurality of first guide frames 11 formed in the shape of thin plates. First guide frames 11 are horizontally disposed and stacked so as to be parallel with each other on their corresponding back sides (i.e. the left side in FIG. 5) in a housing 51. A plurality of second guide frames 41 are also formed in the shape of thin plates. Second guide frames 41 are stacked vertically and are disposed on a front side of first guide frames 11 (i.e. the right side in FIG. 5) so as to cross first guide frames 11 in housing 51.

Figure 1:
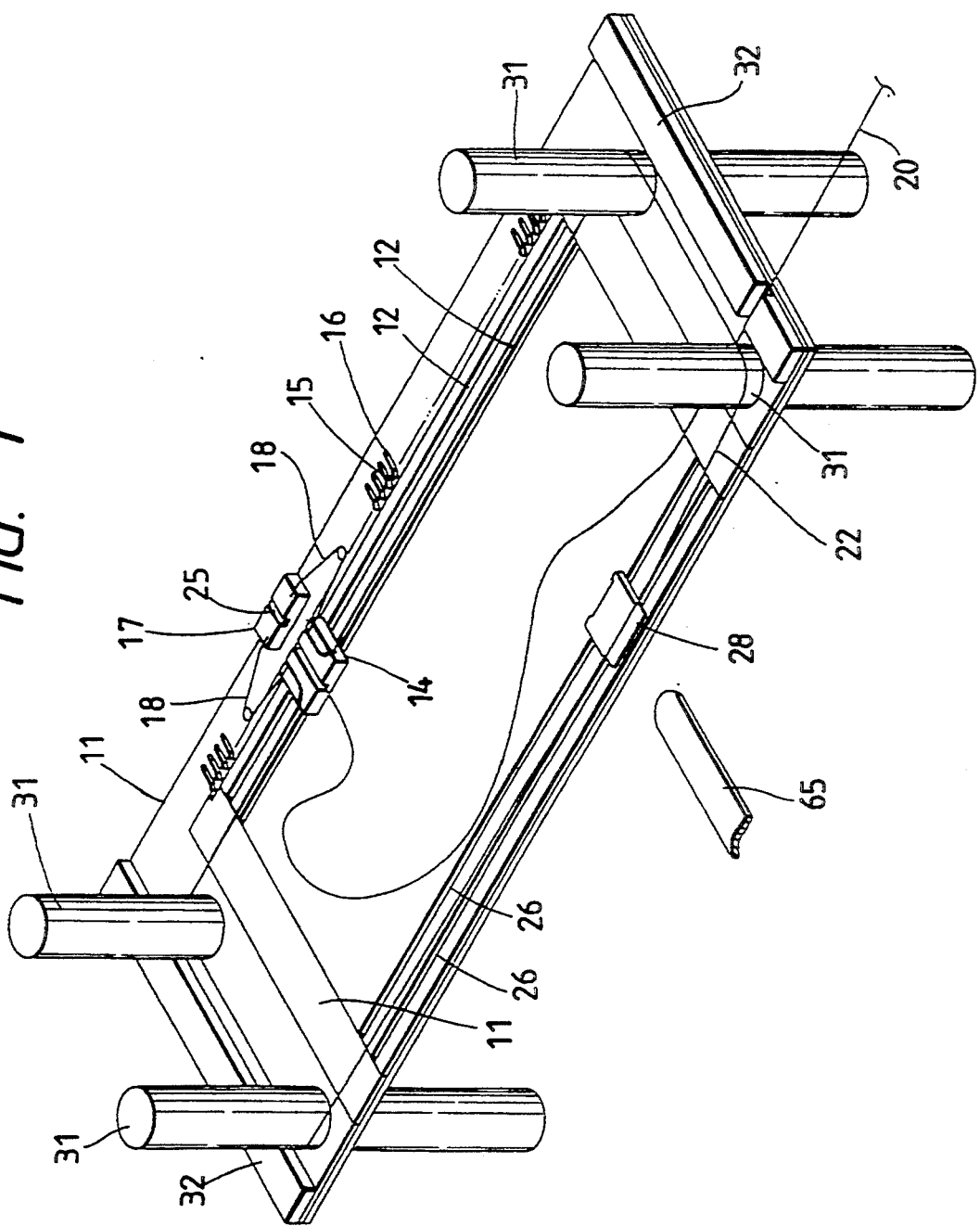
FIG. 1 is a schematic perspective view of an optical fiber switching apparatus according to the present invention.
Figure 3:
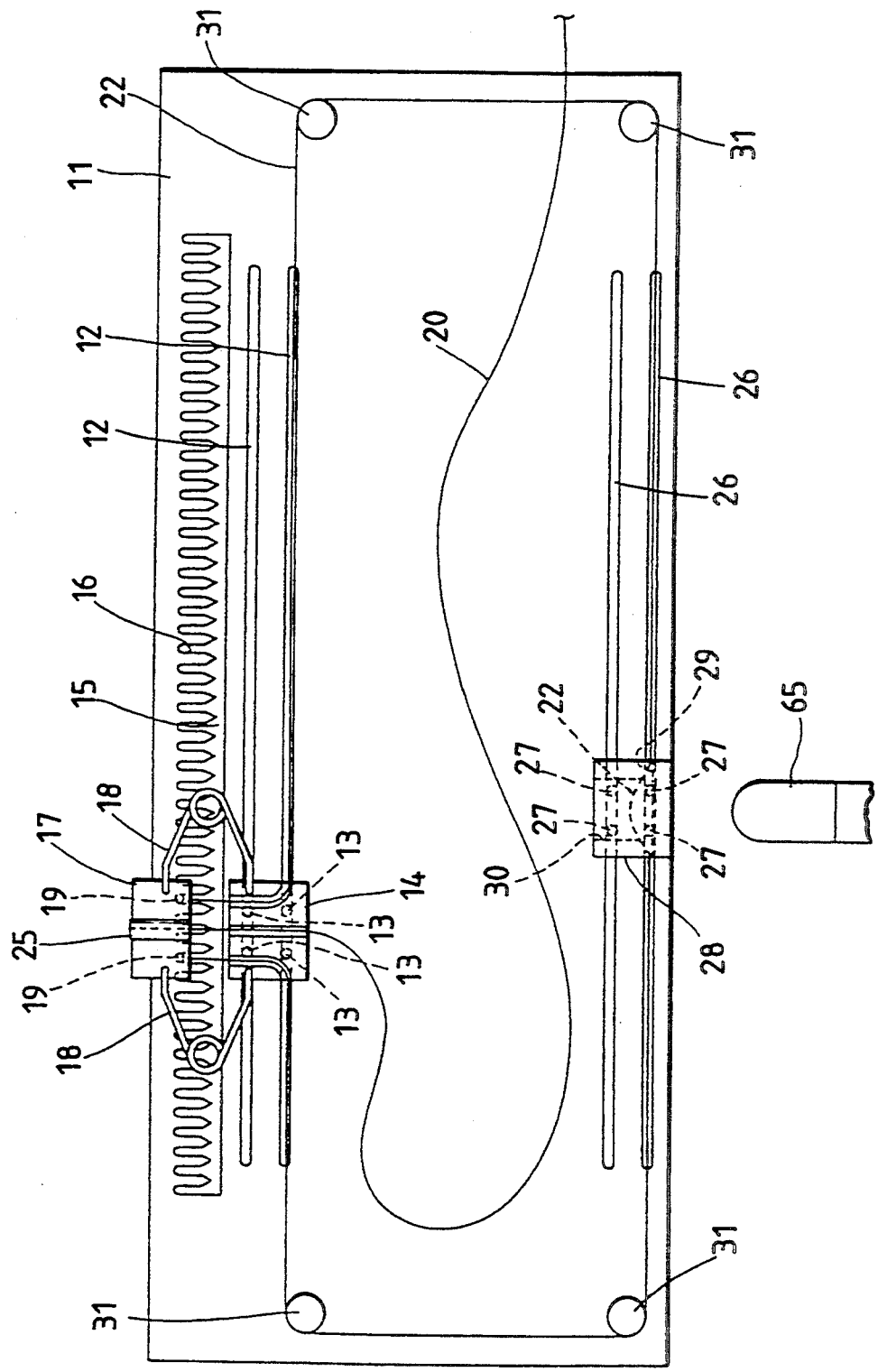
FIG. 3 is a plan view of an optical fiber switching apparatus.

In each first guide frame 11, as shown in FIGS. 1 and 3, a pair of first guide grooves 12 are formed along the front of first guide frame 11. First guide grooves 12 are formed so as to be parallel with each other. A first moving member 14 is movably attached to first guide grooves 12 by the use of first guide pins 13. An engagement groove 15 is formed on first guide frame 11. Engagement groove 15 is also formed parallel to first guide grooves 12 and has a comb portion 16.

A first slide terminal 17 is coupled to first moving member 14 by use of a pair of springs 18 which act as support members. First moving member 14 is movably attached in engagement groove 15 through second guide pins 19. Moving member 14 is arranged so as to be locked to first guide frame 11 when second guide pins 19 are fitted into comb portion 16 by the use of springs 18.

Figure 2:
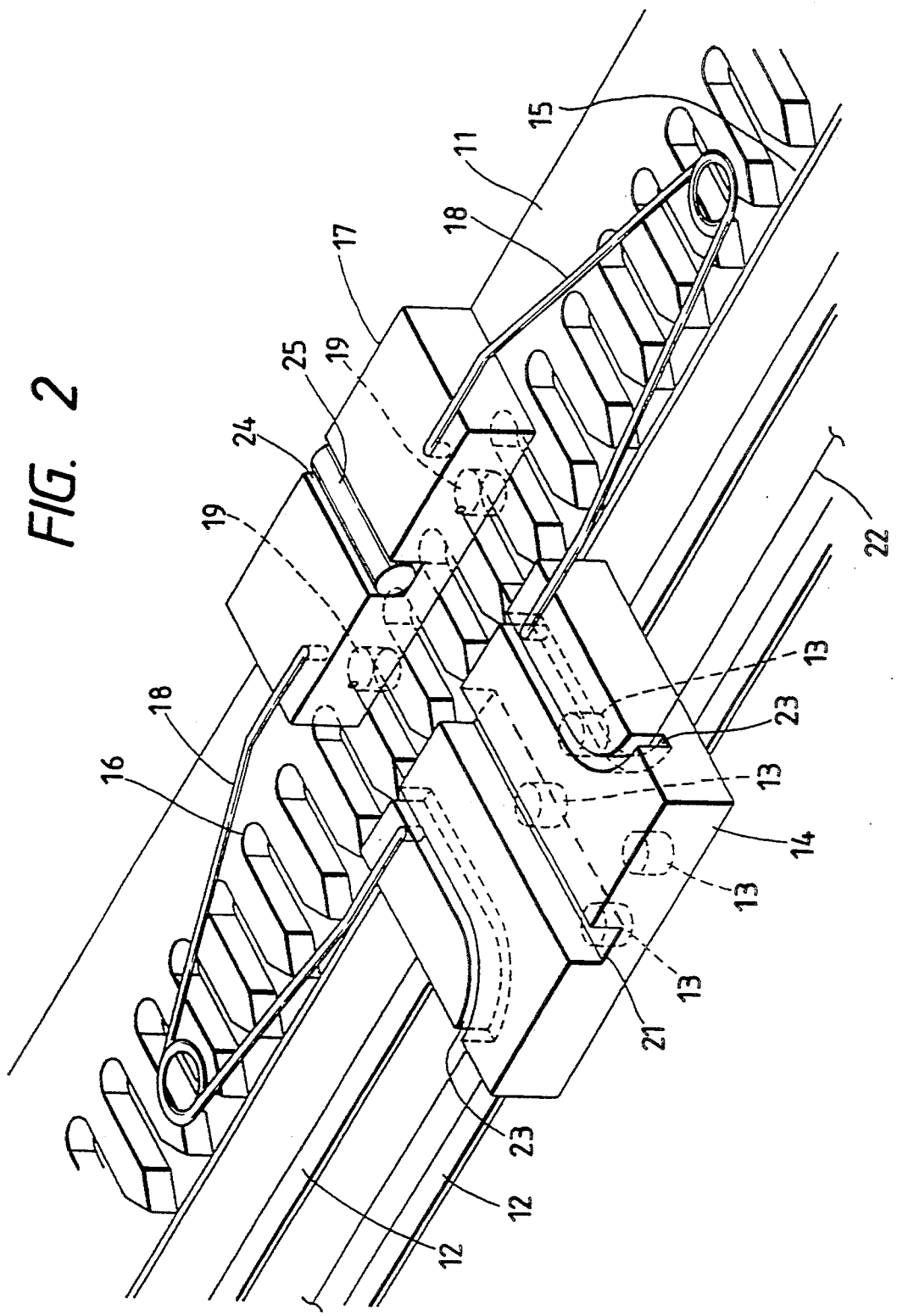
FIG. 2 is a schematic perspective view of a moving member and a slide terminal of an optical fiber switching apparatus.

As seen in FIG. 2, a passage groove 21 is formed in a center portion of first moving member 14 and is perpendicular to the direction of movement of first moving member 14. Passage groove 21 accepts a first optical fiber 20 which acts as an optically coupled member for switching. A pair of arc-like passage grooves 23 are formed on opposite sides of passage groove 21. A first driving wire 22 is inserted in each arc-like passage grooves 23. A holding groove 24, which is able to communicate with passage groove 21, is formed in first slide terminal 17. A ferrule 25 is fixed to holding groove 24 and holds an end portion of first optical fiber 20.

As shown in FIGS. 1 and 3, a parallel pair of second guide grooves 26 are formed along the back of first guide frame 11. A first driving member 28 is movably attached to second guide grooves 26 by third guide pins 27. First driving member 28 has a passage hole 29 which is formed in the direction of movement of first driving member 28. Thus passage hole 29 is formed in the longitudinal direction of second guide grooves 26 so that first driving wire 22 can be inserted through passage hole 29. A through hole 30 is formed perpendicular to passage hole 29 so that a driving piece 65 can be inserted-into or separated-from through hole 30.

Support pins 31 are disposed in each of the corner portions of first guide frame 11. First driving wire 22 is looped around the outside of each support pin 31 and is passed through passage hole 29. The ends of first driving wire 22 are coupled to first slide terminal 17 through their respective arc-like passage groove 23. First driving wire 22 is curved through first driving member 28 so that first driving wire 22 is slightly loose when first slide terminal 17 is separated from first moving member 14 and second guide pins 19 are fitted into comb portion 16.

As shown in FIG. 5, the difference between second guide frames 41 and first guide frames 11 is merely their respective positions. Thus, second guide frames 41 have components mounted thereon which are similar to the components mounted on first guide frames 11. For example, second guide frames 41 contain a second moving member 42, a second slide terminal 43, a second driving member 44, a second driving wire 45 and a second optical fiber 46 which is to be connected and switched to first optical fiber 20. Therefore, a detailed description of these components is not included herein. However, the corresponding descriptions of the components of first guide frames 11 should be consulted if there is any question as to how second guide frames 41 are designed.

In the preferred embodiment, approximately 100 first guide frames 11 and second guide frames 41, each of which is approximately 0.5 mm thick, are stacked and separated by spacers 32 as shown in FIG. 1. Each spacer 32 is approximately 0.5 mm thick. First and second moving members 14 and 42, first and second slide terminals 17 and 43, and first and second driving members 28 and 44 are also approximately 0.5 mm thick. Accordingly, each unit (i.e. a guide frame 11 or 41 and all of the parts disposed thereon, including a spacer 32) is approximately 1.0 mm thick.

As shown in FIG. 5, driving mechanisms for first and second driving members 28 and 44 are provided for enabling the connection of first and second optical fibers 20 and 46. Driving members 28 and 44 are also provided for allowing the connection between first and second optical fibers 20 and 46 to be switched. Two upper and lower horizontal drivers 53 are provided (the upper left and lower right horizontal driver 53 are not shown in FIG. 5). Each upper horizontal drivers 53 is coupled through a vertical coupling shaft 52 to a corresponding lower horizontal driver 53, thereby forming two pairs of horizontal drivers 53. Each horizontal driver 53 is movably supported by a corresponding horizontal guide 54 which is attached to housing 51. Each pair of horizontal drivers 53 is engaged with a corresponding horizontal screw shaft 55. Each horizontal screw shaft 55 is coupled to a corresponding horizontal driving motor 56 through a corresponding horizontal coupling belt 57, thereby allowing each horizontal driver 53 to be driven.

Two left and right vertical drivers 59 are also provided. Each left vertical driver 59 is coupled to a corresponding right vertical driver 59 through a horizontal coupling shaft 58, thereby creating two pairs of vertical drivers 59. Each vertical driver 59 is movably supported by a corresponding vertical guide 60 which is attached to housing 51. Each pair of vertical drivers 59 is engaged with a corresponding vertical screw shaft 61. Each vertical screw shaft 61 is coupled with a corresponding vertical driving motor 62 through a corresponding vertical coupling belt 63, thereby allowing each vertical driver 59 to be driven.

Figure 4:
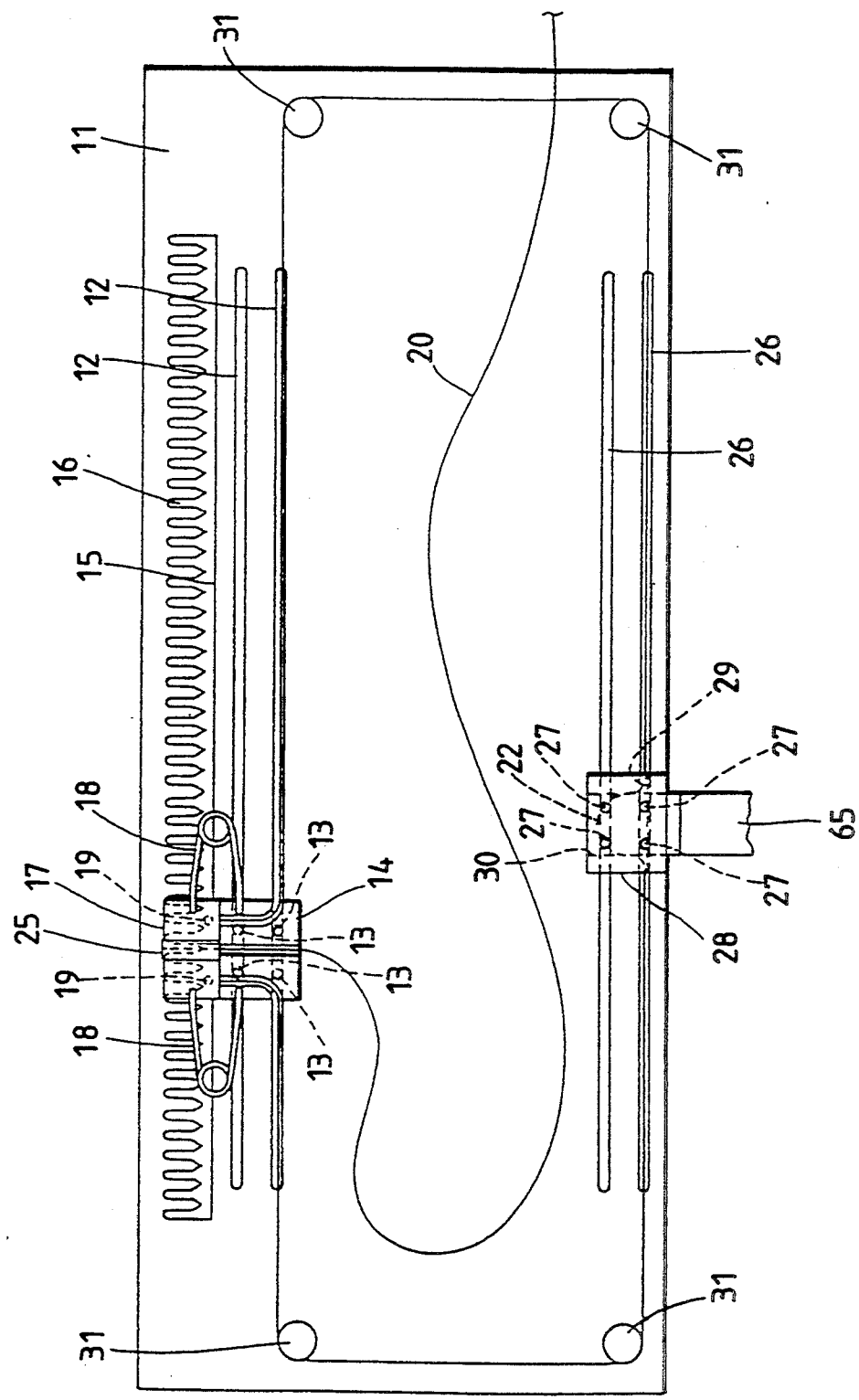
FIG. 4 is a plan view showing the function of an optical fiber switching apparatus.

A first driver 64 is disposed at the back side of first guide frame 11, and is penetrated by one of the vertical coupling shafts 52 and one of the horizontal coupling shafts 58. In this configuration, first driver 64 can be moved up and down, and right and left by the driving of the respective horizontal driving motor 56 and the respective vertical driving motor 62. A first driving shaft 66, in which an arc-like horizontal driving piece 65 is formed on the top end portion thereof, is movably mounted on the first driver 64. First driving shaft 66 can be moved by a shaft driving motor (not shown). Arc-like horizontal driving piece 65 fits into through hole 30 of first driving member 28 so that arc-like horizontal driving piece 65 can make first driving wire 22, which was originally loose, as shown in FIG. 3, tense, as shown in FIG. 4.

Although a driving mechanism for driving second driving member 44 is provided in housing 51, it has substantially the same structure, except that an arc-like vertical driving piece 69 of second driving shaft 68 is mounted in a vertical direction instead of the horizontal direction in which arc-like horizontal driving piece 65 is mounted in. Therefore, a detailed description of these components is not included herein. However, the corresponding descriptions of the components of first driver 64 should be consulted if there is any question as to how second driver 67 is designed or operates.

The operation of making a connection and changeover the connection between optical fibers by the optical fiber switching apparatus of this embodiment will now be described. As shown in FIG. 5, first driver 64 is moved up and down, and right and left by the driving of the respective horizontal driving motor 56 and the respective vertical driving motor 62. Thus, first driver 64 can be located in a predetermined position. For example, arc-like horizontal driving piece 65 of first driver 64 can be moved so as to be opposite to first driving member 28 of a selected one of the first guide frames 11, as shown in FIG. 3. First driving shaft 66 can then be moved forward so as to fit arc-like horizontal driving piece 65 into through hole 30 of first driving member 28, as shown in FIG. 4. First driving wire 22, which was loose in first driving member 28, is then made tense. The end portion of first driving wire 22 is then pulled so that first slide terminal 17 moves against the force of springs 18. As a result, first guide pins 13 are drawn out of comb portion 16 so as to release the fitting, thereby allowing first slide terminal 17 and first moving member 14 to contact tightly with each other.

In other words, when the respective horizontal driving motor 56 is driven so as to move first driver 64 into position behind a selected first driving member 28 and arc-like horizontal driving piece 65 inserted into the corresponding through hole 30, first driving wire 22 is longitudinally. First slide terminal 17 and first moving member 14 then move along the pair of first guide grooves 12. Horizontal driving motor 56 is stopped when first slide terminal 17 reaches a position where the end portion of first optical fiber 20 is opposite to the end portion of second optical fiber 46, thereby allowing the switching of the connection between first optical fibers 20 and second optical fiber 46.

Once the connection is switched, first driving shaft 66 is moved backward, thereby drawing arc-like horizontal driving piece 65 out of through hole 30, as shown in FIG. 3. The tension of first driving wire 22 is loosened as a result of the removal of arc-like horizontal driving piece 65 from through hole 30. The loosening of first driving wire 22 in turn causes first slide terminal 17 to be moved by the urging force of springs 18. First guide pins 13 are then fitted into comb portion 16 of the engagement groove 15, thereby causing first slide terminal 17 to be locked in place. Thus, the positioning of first optical fiber 20 is complete.

Second driver 67 is moved in a similar manner so as to position arc-like vertical driving piece 69 opposite to a selected second driving member 44. Arc-like vertical driving piece 69 is then fitted into a through hole (not shown) of the selected second driving member 44 so as to create tension or loosen second driving wire 45. Furthermore, the engagement of second slide terminal 43 causes it to be released so that second slide terminal 43 is brought into tight contact with second moving member 42. Second driver 67 is then moved vertically so as to cause second driving member 44 to be moved through the use of arc-like vertical driving piece 69. Second driving wire 45 is then moved longitudinally. Accordingly, second slide terminal 43 moves along the guide grooves of the corresponding second guide frame along with second moving member 42. Second slide terminal 43 is stopped when it reaches a position where the end portion of second optical fiber 46 is opposite to the end portion of first optical fiber 20.

Once in position, arc-like vertical driving piece 69 is moved so that it is drawn out of the through hole which corresponds to the second driving member 44. As a result, the tension on second driving wire 45 is released. Accordingly, second slide terminal 43 is locked in the appropriate engagement grooves. The end portions of first optical fiber 20 and second optical fiber 46 are therefore positioned opposite to each other with a predetermined distance between them so as to allow first and second optical fibers 20 and 46 to be optically coupled with each other. Thus, the process of switching of the optical fibers is complete.

The aforementioned operations of connecting and switching connections between optical fibers are performed automatically by a control means. The procedures of moving first and second optical fibers 20 and 46 are not intended to be limited to the procedures described in the preferred embodiment.

Although, in the preferred embodiment, the connecting and switching of connections between optical fiber is performed by inserting first optical fiber 20 into ferrule 25, which is formed on holding groove 24, as shown in FIG. 2, optical coupling by the use of a capirally will now be described.

Figure 6:
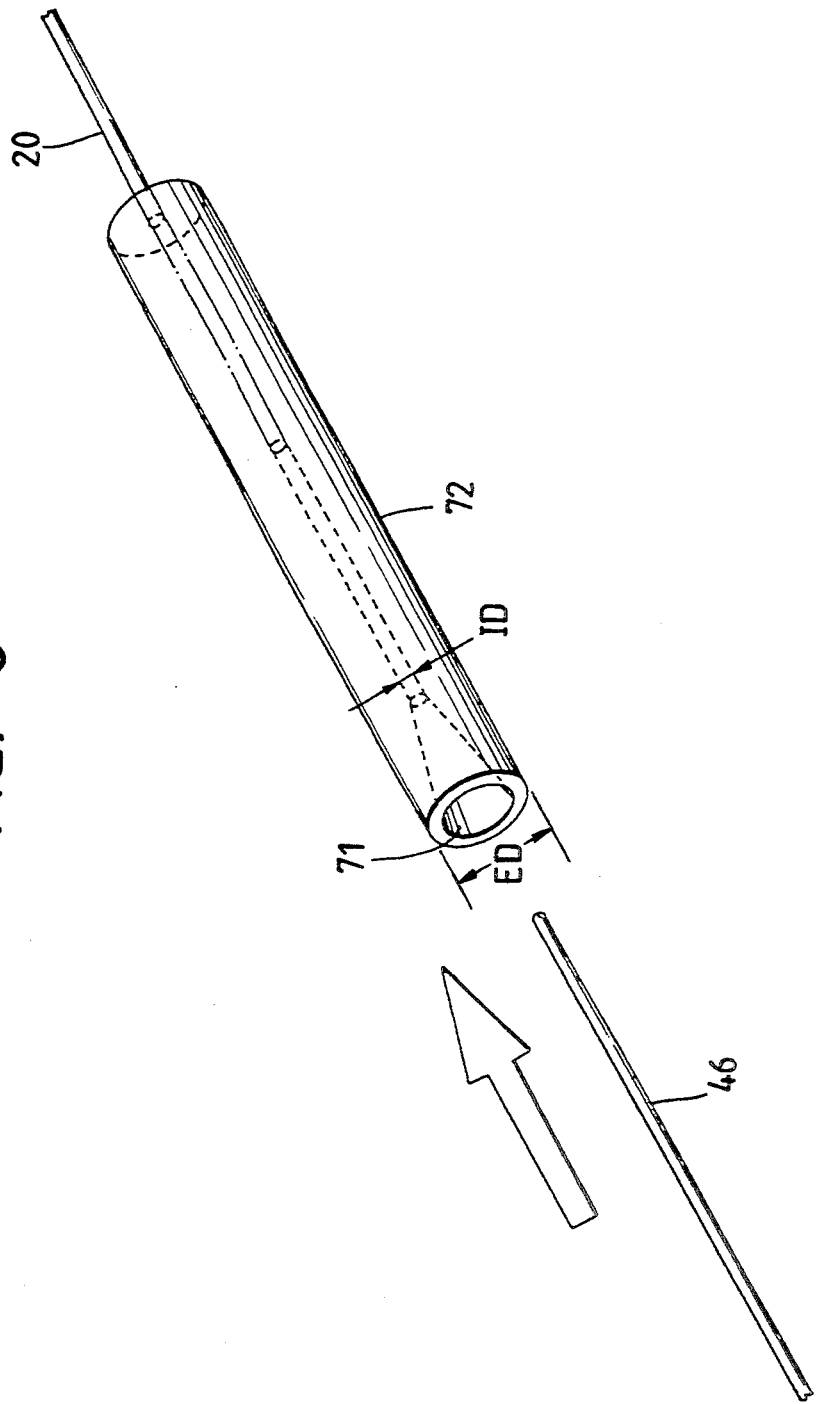
FIG. 6 is a schematic perspective view showing the function of an optical fiber switching apparatus.

FIG. 6 is a schematic view showing optical coupling by the use of a capirally 72. First optical fiber 20 is inserted into capirally 72. Capirally 72 has a taper-shaped insertion opening 71. The internal diameter of taper-shaped insertion opening 71 decreases from the top end to the internal end thereof. Second optical fiber 46 is inserted into taper-shaped insertion opening 71 so that the end portion of second optical fiber 46 opposes the end portion of first optical fiber 20. Thus, optical coupling can occur. It is noted that taper-shaped insertion opening 71 has a face which is flat and smooth so that the end of second optical fiber 46 is not chipped. Furthermore, capirally 72 is of low-cost as compared to other optical connector, thereby reducing the cost of the switching apparatus.

Figure 7:
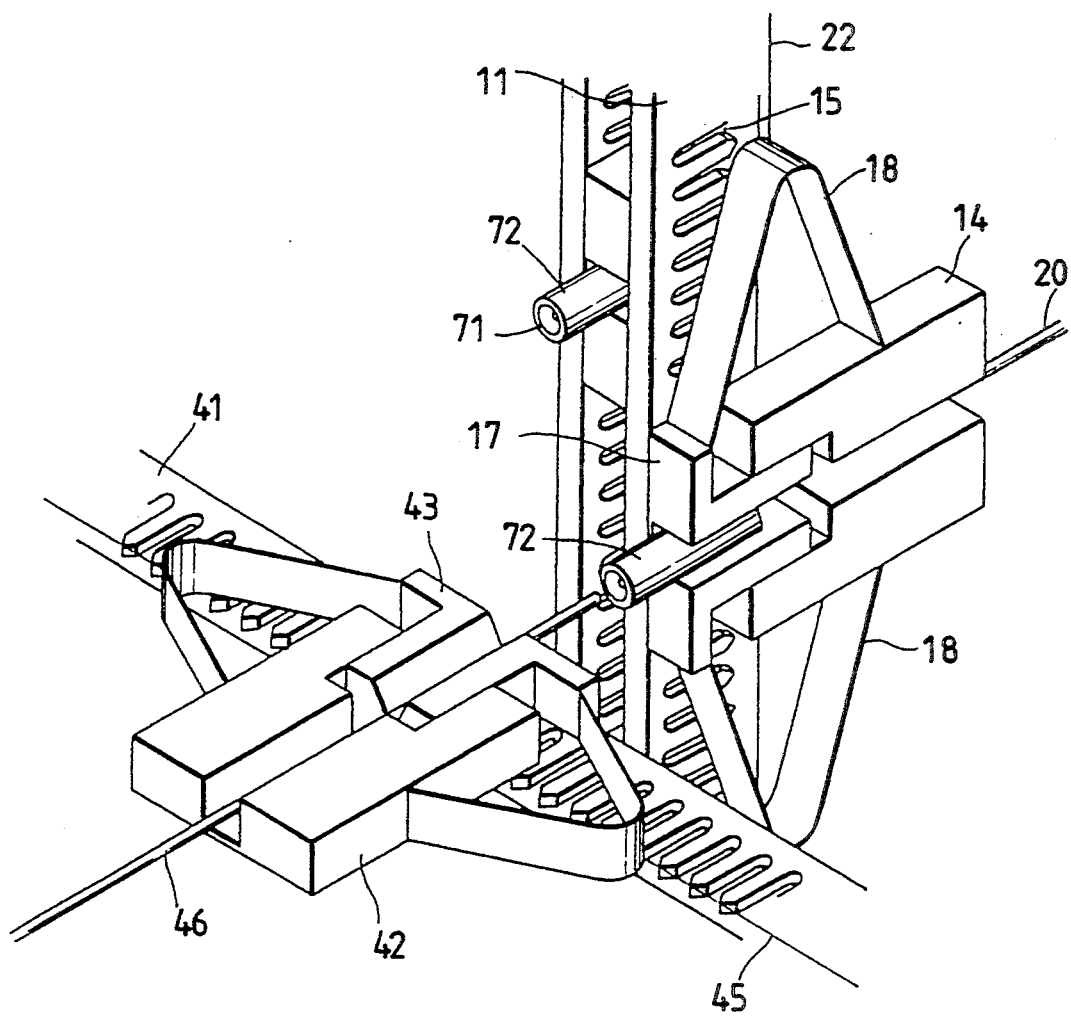
FIG. 7 is a schematic perspective view showing a optical coupling using a capirally.

FIG. 7 is a schematic view showing the use of capirally 72 in an optical fiber switching apparatus according to the present invention. The elements depicted in FIG. 7 are substantially the same as the elements depicted in FIGS. 1–5. Thus, the same numerals are used to designated the elements which are the same. Moreover, so as not to be repetitive, the description of these elements is omitted. However, the positions of first guide frame 11 and second guide frame 41 have been reverse for the explanation which follows.

Referring to FIG. 6, the external diameter (ED) of the capirally 72 is approximately 1 mm, the internal diameter (ID) thereof is approximately 0.126 mm and the taper diameter of the end portion is approximately 0.72 mm. The terminals can slide right and left or up and down and can push forward second optical fiber 46 or capirally 72. Capirally 72 is fixed to first slide terminal 17, and first optical fiber 20 is fixed in capirally 72. Second optical fiber 46 is fixed to second slide terminal 43.

Second slide terminal 43 is moved to a position so that it opposes first slide terminal 17 by a moving unit as a robot hand or the like. Second slide terminal 43 is also pushed forward so that second optical fiber 46 is inserted into capirally 72, thereby causing first and second optical fibers 20 and 46 to become optically coupled. Even if an axis aberration of about ±0.3 mm is generated between second optical fiber 46 and capirally 72, the elastic deformation of second optical fiber 46 and taper-shaped insertion opening 71 of capirally 72 enables optical coupling to be accomplished.

As described above, second optical fiber 46 is disposed in second slide terminal 43. Capirally 72 is fixed to first optical fiber 20 and both are disposed in first slide terminal 17. Second slide terminal 43 is pushed forward so as to insert second optical fiber 46 into capirally 72. Once inserted into capirally 72, first and second optical fibers 20 and 46 oppose each other so as to allow optical coupling thereof.

Since the external diameter (ED) of capirally 72 can be extremely small and since the internal diameter (ID) thereof can be substantially same as the external diameter of an optical fiber inserted therein, first slide terminal 17 can be extremely small thereby allowing the miniaturization of the entire switching apparatus.

The taper-shaped insertion opening 71 is formed on an insertion end portion of capirally 72 so that second optical fiber 46 is deformed elastically so as to allow second optical fiber 46 to be easily inserted into capirally 72 from the insertion end thereof even if second optical fiber 46 is displaced from the position of capirally 72. In other words, the position of capirally 72 causes second optical fiber 46 to be deflected. Accordingly, is not required that the positions of first and second slide terminals 17 and 43 be precise when stopped and locked in position.

Figure 8:
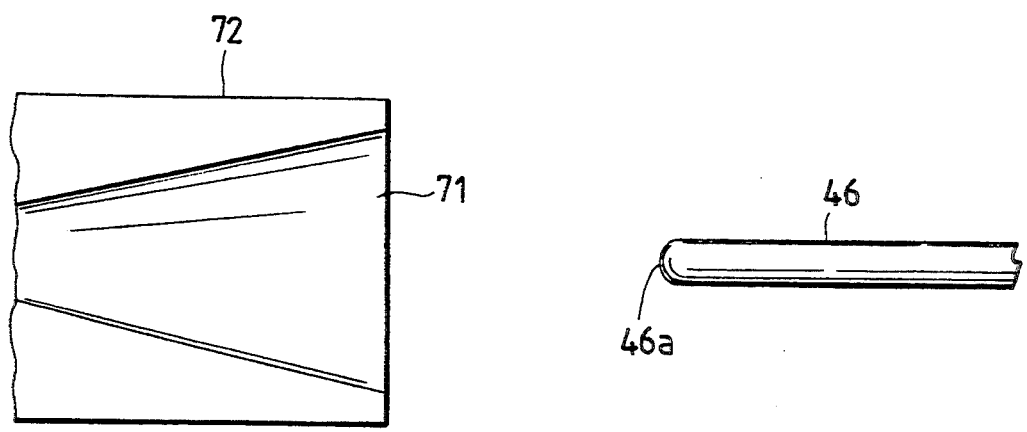
FIG. 8 is a plan view showing a top end of a capirally and an end face of an optical fiber.

FIG. 8 is a plan view showing the end of capirally 72 and the end face 46a of second optical fiber 46. As shown in FIG. 8, end face 46a of is rounded. Rounding of end face 46a can be performed by grinding or electrically discharging. Rounding of end face 46a helps to ensure that second optical fiber 46 is not chipped when it comes in contact with taper-shaped insertion hole 71. Furthermore, second optical fiber 46 is coated with carbon layer so as to increase the durability of the second optical fiber 46. Durability is important since second optical fiber 46 undergoes elastic deformation when displaced by taper-shaped insertion opening 71.

Figure 9:
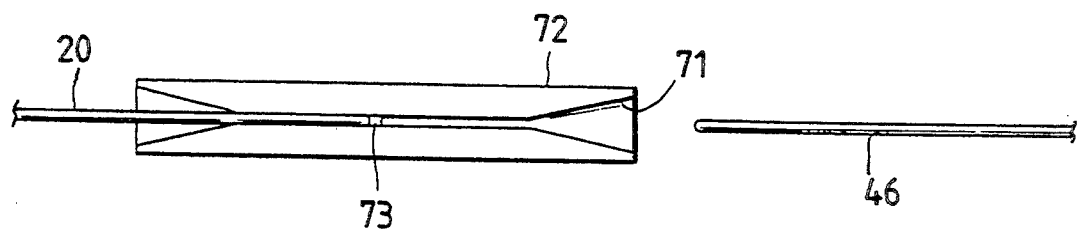
FIG. 9 is a plan view showing a silicone thin film formed on an end face of an optical fiber which is fixed in a capirally.

FIG. 9 shows a silicone thin film 73 formed on the end face of first optical fiber 20. Silicone thin film 73 is formed on the end face of first optical fiber 20 so as to prevent the reflection of the light which is propagated along first optical fiber 20.

As has been described in detail above, in the optical fiber switching apparatus according to the present invention, a moving member is provided which moves along a guide groove of a guide frame. A slide terminal for supporting an end portion of an optical fiber is coupled with the moving member through a support member. In this configuration, the slide terminal can approach or move away from the moving member. Furthermore, the slide terminal can be locked to the guide frame. The end portions of a driving wire are coupled with the slide terminal through the moving member so that the driving wire is formed into a loop. Accordingly, the slide terminal is moved by a driving means through the traction of the end portions of the driving wire. The moving member is also moved at the same time by the longitudinal movement of the driving wire. Thus, moving, positioning and holding of the optical fibers, and optical coupling of the optical fibers can be performed by only the movement of the driving wire. Not only it is possible to miniaturize the switching apparatus, it is also possible to simplify its structure, reduce its cost, and facilitate the switching operation of the switching apparatus.

For improved optical coupling, the above switching apparatus uses a capirally which also solves the problem of miniaturization with respect to the size of the optical connector. In addition, since typical optical connector permits only small displacements of optical fibers, high precision is required to couple the optical fibers when such a connector is used. However, the taper-shaped insertion opening of the capirally allows for easy insertion of the optical fiber and even accomplishes stable optical coupling when there is a displacement in the position between the optical fiber to be inserted and the capirally.

The end face of the optical fiber is rounded and the taper-shaped insertion opening of the capirally is smooth so as to prevent chipping of the optical fiber when it is being inserted into the capirally. The optical fiber being inserted can also be coated with a carbon layer so as to increase the durability of the optical fiber since it may undergo elastic deformation. Furthermore, measures may be taken so as to deal with the reflection of the light. A conventional method uses index matching material. However, the material can not be filled in the capirally sufficiently because of the extremely thin internal diameter of the capirally. This usually causes bubbles to be generated in the material when the optical fiber is inserted or extracted because of change of the internal pressure of the capirally. However, in the present invention, a silicone thin film is formed on the end face of the optical fiber which is fixed into the capirally so as to solve the problems just described, thereby preventing the reflection of the light.

What is claimed is:

1. An optical fiber switching apparatus comprising:
an apparatus body;
   a guide frame, which is supported by the apparatus body, having a guide groove;
   a moving member disposed on the guide groove so as to be movable along the guide grove;
   a slide terminal for supporting an end face of an optical fiber;
   support means for connecting the slide terminal to the moving member, for enabling the slide terminal to approach the moving member thereby causing the slide terminal to enter an unlocked position, and for enabling the slide terminal to move away from the moving member thereby causing the slide terminal to enter a locked position on the guide frame;
   a driving wire having a first end portion and a second end portion, the first end portion and the second end portion are disposed through the moving member and are coupled to the slide terminal, thereby forming a loop in the driving wire;
   driving means for causing the slide terminal to enter the unlocked position by creating tension on the driving wire and thereby causing the first end portion and the second end portion to move the slide terminal towards the moving member, and for moving the moving member along the guide groove by a longitudinal movement of the driving wire when the slide terminal is in the unlocked position.

2. An optical fiber switching apparatus, having a first side and a second side, comprising:
   a plurality of optical coupling members disposed on the first side of the apparatus, the optical coupling members are substantially parallel to each other;
   a guide frame, which is supported on the second side of the apparatus, having a guide groove, the guide grove extending in a direction so as to be substantially perpendicular to a direction of each of the optical coupling members;
   a moving member disposed on the guide groove so as to be movable along the guide groove;
   a slide terminal for supporting an end face of an optical fiber;
   support means for connecting the slide terminal to the moving member, for enabling the slide terminal to approach the moving member thereby causing the slide terminal to enter an unlocked position, and for enabling the slide terminal to move away from the moving member thereby causing the slide terminal to enter a locked position on the guide frame;
   a driving wire having a first end portion and a second end portion, the first end portion and the second end portion are disposed through the moving member and are coupled to the slide terminal, thereby forming a loop in the driving wire;
   driving means for causing the slide terminal to enter the unlocked position by creating tension on the driving wire and thereby causing the first end portion and the second end portion to move the slide terminal towards the moving member, and for moving the moving member along the guide groove by a longitudinal movement of the driving wire when the slide terminal is in the unlocked position so that the end face of the optical fiber is disposed opposite to a selected one of the optical coupling members.

3. An optical fiber switching apparatus comprising:
   a plurality of first guide frames, which are in a first stacked position so that all of the first guide frames are substantially parallel to each other, each first guide frame has a first guide groove and a first engagement groove;
   a plurality of second guide frames, which are in a second stacked position so that all of the second guide frames are substantially parallel to each other and are substantially perpendicular to each of the first guide frames, each second guide frame has a second guide groove and a second engagement groove;
   a plurality of first moving members, each disposed on a corresponding one of the first guide grooves so as to be movable along the corresponding first guide groove;
   a plurality of second moving members, each disposed on a corresponding one of the second guide grooves so as to be movable along the corresponding second guide groove;
   a plurality of first slide terminals, each for supporting a first end face of a corresponding first optical fiber;
   a plurality of second slide terminals, each for supporting a second end face of a corresponding second optical fiber;
   support means for connecting each of the first slide terminals to a corresponding one of the first moving members, for connecting each of the second slide terminals to a corresponding one of the second moving members, for enabling each first slide terminal to approach the corresponding first moving member thereby causing each first slide terminal to enter a first unlocked position, for enabling each first slide terminal to move away from the corresponding first moving member thereby causing each first slide terminal to enter a first locked position on a corresponding one of the first engagement grooves; for enabling each second slide terminal to approach the corresponding second moving member thereby causing each second slide terminal to enter a second unlocked position, and for enabling each second slide terminal to move away from the corresponding second moving member thereby causing each second slide terminal to enter a second locked position on a corresponding one of the second engagement grooves;
   a plurality of first driving wires, each having a first end portion and a second end portion, the first end portion and the second end portion of each first driving wire are disposed through a corresponding one of the first moving members and are coupled to a corresponding one of the first slide terminals, thereby forming a loop in each of the first driving wires;
   a plurality of second driving wires, each having a third end portion and a fourth end portion, the third end portion and the fourth end portion of each second driving wire are disposed through a corresponding one of the second moving members and are coupled to a corresponding one of the second slide terminals, thereby forming a loop in each of the second driving wires;

driving means for causing a selected one of the first slide terminals to enter the first unlocked position by creating tension on the first driving wire and thereby causing the first end portion and the second end portion to move the selected first slide terminal towards the corresponding first moving member, for moving the corresponding first moving member along the corresponding first guide groove by a longitudinal movement of the first driving wire when the selected first slide terminal is in the first unlocked position; for causing a selected one of the second slide terminals to enter the second unlocked position by creating tension on the second driving wire and thereby causing the third end portion and the fourth end portion to move the selected second slide terminal towards the corresponding second moving member, and for moving the corresponding second moving member along the corresponding second guide groove by a longitudinal movement of the second driving wire when the selected second slide terminal is in the second unlocked position.

4. An optical fiber switching apparatus comprising:

a plurality of first guide frames, which are in a first stacked position so that all of the first guide frames are substantially parallel to each other, each first guide frame has a first guide groove and a first engagement groove;

a plurality of second guide frames, which are in a second stacked position so that all of the second guide frames are substantially parallel to each other and are substantially perpendicular to each of the first guide frames, each second guide frame has a second guide groove and a second engagement groove;

a plurality of first moving members, each disposed on a corresponding one of the first guide grooves so as to be movable along the corresponding first guide groove;

a plurality of second moving members, each disposed on a corresponding one of the second guide grooves so as to be movable along the corresponding second guide groove;

moving means for moving each first moving member and each second moving member;

a plurality of elastic members;

a plurality of first slide terminals, each first slide terminal being connected by one of the elastic members to a corresponding one of the first moving members, thereby allowing each first slide terminal to either approach the corresponding first moving member and thereby cause each first slide terminal to enter a first unlocked position along the first engagement groove or to move away from the corresponding first moving member and thereby cause each first slide terminal to enter a first locked position along the first engagement groove;

a plurality of second slide terminals, each second slide terminal being connected by one of the elastic members to a corresponding one of the second moving members, thereby allowing each second slide terminal to either approach the corresponding second moving member and thereby cause each second slide terminal to enter a second unlocked position along the second engagement groove or to move away from the corresponding second moving member and thereby cause each second slide terminal to enter a second locked position along the second engagement groove;

supporting means, disposed in each of the first slide terminals, each for supporting a corresponding first optical fiber, the first optical fiber having a first end face; and a plurality of capirallies, disposed in each of the second slide terminals, each having a corresponding second end face of a second optical fiber fixed therein; and wherein a selected one of the first optical fiber can be inserted into a selected one of the capirallies when the first slide terminal which corresponds to the selected first optical fiber enters the first locked position and the second slide terminal which corresponds to the selected capirally enters the second locked position, thereby allowing optical coupling between the selected first optical fiber and the second optical fiber which corresponds to the selected capirally.

5. An optical fiber switching apparatus according to claim 4, wherein each capirally has a taper-shaped insertion opening, each taper-shaped insertion opening having an internal diameter which decreases and an inside face which is smooth, and wherein the first end face is rounded.

6. An optical fiber switching apparatus according to claim 4, wherein each first optical fiber is coated by a carbon layer.

7. An optical fiber switching apparatus according to claim 4, wherein a silicone thin film is formed on each of the second end faces.

8. An optical fiber switching apparatus according to claim 5, wherein the first end face is rounded by grinding or electrical discharging.

9. An optical fiber switching apparatus according to claim 6, wherein a silicone thin film is formed on each of the second end faces.

* * * * *